March 8, 1949.　　　M. J. DEVINE　　　2,463,605
TRACTION GRIP
Filed May 20, 1947
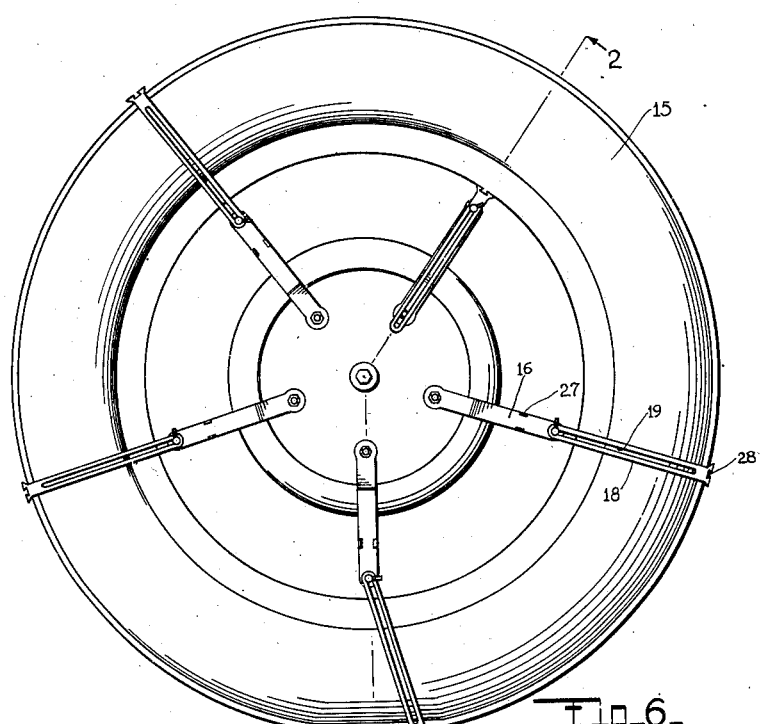
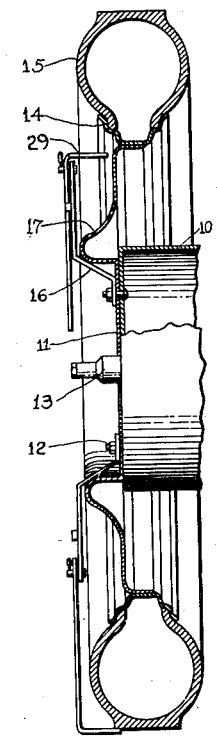
*INVENTOR.*
MARTIN J. DEVINE
BY *Victor J. Evans & Co.*
ATTORNEYS Patented Mar. 8, 1949

2,463,605

UNITED STATES PATENT OFFICE 2,463,605

TRACTION GRIP

Martin J. Devine, Englewood, N. J.

Application May 20, 1947, Serial No. 749,178

2 Claims. (Cl. 152—216)

This invention relates to a traction grip for tractors or other wheeled vehicles.

It is an object of the present invention to provide a traction grip for wheels which can be easily applied to the clamping nuts which connect the wheel rim to the brake drum wherein the grip elements can be extended radially therefrom and laterally under the tire tread and wherein said elements are free to pivot and properly locate themselves under the tire tread.

Other objects of the present invention are to provide a traction grip arrangement which is of simple construction, inexpensive to manufacture and efficient in operation.

For other objects and for a better understanding of the invention, reference may be had to the following detailed description taken in connection with the accompanying drawing, in which Fig. 1 is a side elevational view of the traction grip elements connected to the wheel clamping elements.

Fig. 2 is a cross-sectional view, in elevation, taken on line 2—2 of Fig. 1.

Fig. 3 is an enlarged cross-sectional view taken through the connection of the hinged element with the fixed arms.

Fig. 4 is an enlarged perspective view of the ground engaging portion of the hinge element.

Fig. 5 is a cross-sectional view showing a modified form of hinged gripping element and a different connection of the gripping element with the fixed attaching members, the connection being effected by means of a chain.

Referring now to the figures, 10 represents a brake drum to which a wheel hub portion 11 is attached by means of clamping bolts 12. A shaft 13 extends through the hub portion 11. The wheel hub portion 11 has a rim 14 to which a tire 15 is attached.

To the clamping bolts 12 there is attached fixed elements 16. These fixed elements extend laterally outwardly over an enlargement 17 on the wheel hub 11 and radially outwardly. These elements 16 are retained against lateral displacement to any great extent by extending into the curved face of the enlargement 17.

Adapted to be connected to the ends of the elements 16 are tire engaging elements 18. These elements 18 have elongated slots 19 through which extend an attaching bolt 21 having a handle 22 thereon and adapted to be tightened into a clamping nut 23. The bolt 21 extends through a bearing sleeve 24. This sleeve 24 has a flange 25 engaging with the side of the fixed element 16. The clamping bolt 21 retains the element 18 when the same is slid inwardly along the fixed element as shown in Fig. 2. The fixed element has guide projections 27 for retaining the element 18 against pivotal displacement when the same has been retracted upon the element 16. When the tire engaging elements are extended, they are free to pivot and are drawn into gripping engagement as load is applied to them from the tire.

The tire engaging elements have a dovetail groove 28 in a laterally extending portion 29 of the same for receiving a gripping element 31 of triangular section, Fig. 4. The length of the elements 18 are such that with the laterally extending portions 29 in engagement with the tire tread, are angles or adapted to be angled to a slight distance from a radially extending line taken through the element 16.

In Fig. 5 there is shown a modified form of the invention, wherein the tire engaging element has a long laterally extending portion 33 adapted to extend across the full width of the tire tread and upwardly or radially inwardly along the opposite side of the tire as indicated at 34. The tire tread engaging portion 33 is connected by a flexible chain 35 with a fixed element 36 connected to the wheel by clamping bolt 12.

While various changes may be made in the detail construction, it shall be understood that such changes shall be within the spirit and scope of the present invention as defined by the appended claims.

I claim:

1. A traction grip device comprising a bracket element adapted to be connected to a wheel hub to extend radially outwardly over the wheel, a tire tread engaging element having a laterally extending portion adapted to have gripping engagement with the ground, and pin and slot connection means extending between the elements to retain the tire tread engaging element in either its tire engaging position or in a retracted or out of use position, said pin and slot connection means comprising a clamping nut, a pin receiving said nut which when tightened will fix the elements together, said tire engaging element having an elongated slot to permit the sliding of the tire engaging element between its extended and retracted positions.

2. A traction grip device as defined in claim 1 and a bearing sleeve lying within the elongated slot and about the pin whereby to assume the wear and permit the pivotal movement of the tire tread engaging member at any location of the sleeve within the slot, said sleeve having a flange adapted to have frictional engagement with the respective elements to frictionally resist the pivotal movement of the tire tread engaging element upon the element fixed to the wheel.

MARTIN J. DEVINE.

REFERENCES CITED

The following references are of record in the file of this patent:

UNITED STATES PATENTS

| Number | Name | Date |
|---|---|---|
| 1,519,937 | Sedgwick | Dec. 16, 1924 |
| 1,777,928 | Marsch | Oct. 7, 1930 |

FOREIGN PATENTS

| Number | Country | Date |
|---|---|---|
| 813,291 | France | May 29, 1937 |